(12) United States Patent
Rodriguez et al.

(10) Patent No.: US 10,353,269 B2
(45) Date of Patent: Jul. 16, 2019

(54) MULTI-MODE CAVITIES FOR HIGH-EFFICIENCY NONLINEAR WAVELENGTH CONVERSION FORMED WITH OVERLAP OPTIMIZATION

(71) Applicants: Alejandro Rodriguez, Princeton, NJ (US); Zin Lin, Somerville, MA (US); Steven G. Johnson, Arlington, MA (US); Marko Loncar, Belmont, MA (US); Xiangdong Liang, Arlington, MA (US)

(72) Inventors: Alejandro Rodriguez, Princeton, NJ (US); Zin Lin, Somerville, MA (US); Steven G. Johnson, Arlington, MA (US); Marko Loncar, Belmont, MA (US); Xiangdong Liang, Arlington, MA (US)

(73) Assignees: THE TRUSTEES OF PRINCETON UNIVERSITY, Princeton, NJ (US); PRESIDENT AND FELLOWS OF HARVARD COLLEGE, Cambridge, MA (US); MASSACHUSETTS INSTITUTE OF TECHNOLOGY, Cambridge, MA (US)

(*) Notice: Subject to any disclaimer, the term of this patent is extended or adjusted under 35 U.S.C. 154(b) by 0 days.

(21) Appl. No.: 15/443,911

(22) Filed: Feb. 27, 2017

(65) Prior Publication Data

US 2017/0248831 A1  Aug. 31, 2017

Related U.S. Application Data

(60) Provisional application No. 62/300,516, filed on Feb. 26, 2016.

(51) Int. Cl.
G02F 1/35 (2006.01)
G02F 1/355 (2006.01)
G02F 1/37 (2006.01)

(52) U.S. Cl.
CPC ............ *G02F 1/3501* (2013.01); *G02F 1/353* (2013.01); *G02F 1/3551* (2013.01);
(Continued)

(58) Field of Classification Search
CPC .......... G02F 1/3501; G02F 1/353; G02F 1/37
See application file for complete search history.

(56) References Cited

U.S. PATENT DOCUMENTS 4,528,464 A * 7/1985 Chemla ................. B82Y 20/00
                                                      359/326
5,289,309 A * 2/1994 Delacourt ............. B82Y 20/00
                                                       257/21

(Continued)

OTHER PUBLICATIONS

K. W. DeLong, Rick Trebino, J. Hunter, and W. E. White. "Frequency-resolved optical gating with the use of second-harmonic generation." J Opt. Soc. Am. B. vol. 11, No. 11, 2206-2215, Nov. 1994.

(Continued)

*Primary Examiner* — Daniel Petkovsek
(74) *Attorney, Agent, or Firm* — Meagher Emanuel Laks Goldberg & Liao, LLP

(57) ABSTRACT

A fully confined dual frequency optical resonator configured for optical coupling to light having a first frequency ω1. The dual frequency optical resonator includes a plurality of alternating layer pairs configured in a grating configuration, each layer pair having a first layer formed of a first material and a second layer formed of a second material, the first material and second material being different materials. Each layer having a thickness different than a thickness of an adjacent layer to provide thereby aperiodic layer pairs, the thicknesses of adjacent layers being selected to create, via (Continued)

wave interference with each layer, optical resonances at the first frequency ω1 and a second frequency ω2 which is a harmonic of ω1, and to ensure a maximum spatial overlap between confined modes over the materials such that an overall quality factor Q of at least 1000 is achieved.

9 Claims, 9 Drawing Sheets

(52) U.S. Cl.
CPC .............. *G02F 1/3556* (2013.01); *G02F 1/37* (2013.01); *G02F 2001/3503* (2013.01); *G02F 2001/354* (2013.01)

(56) References Cited

U.S. PATENT DOCUMENTS

| | | | | |
|---|---|---|---|---|
| 5,408,110 | A * | 4/1995 | Janz | G02F 1/37 257/13 |
| 5,434,700 | A * | 7/1995 | Yoo | B82Y 20/00 359/332 |
| 6,304,366 | B1 * | 10/2001 | Scalora | B82Y 20/00 359/328 |
| 9,880,445 | B1 * | 1/2018 | Rudolph | G02F 1/37 |
| 10,054,839 | B1 * | 8/2018 | Brener | G02F 1/353 |
| 2013/0155492 | A1 * | 6/2013 | Shen | G02F 1/3501 359/326 |
| 2016/0178983 | A1 * | 6/2016 | Alloatti | G02F 1/0305 385/122 |

OTHER PUBLICATIONS

M. A. Arbore, A. Galvanauskas, D. Harter, M. H. Chou, and M. M. Fejer. "Engineerable compression of ultrashort pulses by use of second-harmonic generation in chirped-period-poled lithium niobate." Opt. Lett. , vol. 22, No. 17, pp. 1341-1343, Sep. 1, 1997.

T. F. Heinz, C. K. Chen, D. Ricard, and Y. R. Shen. "Spectroscopy of molecular monolayers by resonant second-harmonic generation." Phys. Rev. Lett. , vol. 48, No. 7, pp. 478-481, Feb. 15, 1982.

P. S Kuo, K. L. Vodopyanov, M. M. Fejer, D. M. Simanovskii, X. Yu, J. S. Harris, D. Bliss, and D.Weybume. "Optical parametric generation of a mid-infrared continuum in orientation-patterned GaAs." Opt. Lett., vol. 31, No. 1, pp. 71-73, Jan. 1, 2006.

K. L. Vodopyanov, M. M. Fejer, X. Yu, J. S. Harris, Y-S. Lee, W. C. Hurlbut, V G. Kozlov, D. Bliss, and C. Lynch. "Terahertz-wave generation in quasi-phase-matched GaAs." Appl. Phys. Lett., vol. 89, No. 237: 141119, 2006.

Roland Krischek, Witlef Wieczorek. Akira Ozawa, Nikolai Kiesel, Patrick Michelberger, Thomas Udem, and Harald Weinfurter. "Ultraviolet enhancement cavity for ultrafast nonlinear optics and highrate multiphoton entanglement experiments." Nature Photonics, 4: 170-173, Jan. 31, 2010.

Alipasha Vaziri, Gregor Weihs, and Anton Zeilinger. "Experimental two-photon, three-dimensional entanglement for quantum communication." Phys. Rev. Lett., vol. 89, No. 24, 240401, Dec. 9, 2002.

S. Tanzilli, W. Tittel, M. Halder, O. Alibart, P. Baldi, N. Gisin, and H. Zbinden. "A photonic quantum information interface." Nature, vol. 437: 116-120, Sep. 1, 2005.

Sebastian Zaske, Andreas Lenhard, Christian A. Kessler, Jan Kettler, Christian Hepp, Carsten Arend, Roland Albrecht, Wolfgang-Michael Schulz, Michael Jetter, Peter Michler, and Christoph Becher. "Visible-to-telecom quantum frequency conversion of light from a single quantum emitter." Phys. Rev. Lett. , vol. 109:147404. Oct. 2012.

John D. Joannopoulos, Steven G. Johnson, Joshua N. Winn, and Robert D. Meade. "Photonic Crystals: Molding the Flow of Light." Princelon University Press, second edition, Nov. 2007.

Marin Soljacic. Mihai Ibanescu, Steven G. Johnson. Yael Fink, and J. D. Joannopoulos. "Optimal bistable switching in non-linear photonic crystals." Phys. Rev. E Rapid Commun., 66:055601 (R), 2002.

Marin Soljacic, C. Luo, J. D. Joannopoulos, and S. Fan. "Nonlinear photonic crystal microdevices for optical integration." Opt. Lett., vol. 28, No. 8, pp. 637-639. Apr. 15, 2003.

M. F. Yanik, S. Fan, and M. Soljacic. "High-contrast all-optical bistable switching in photonic crystal microcavities." Appl. Phys. Lett. vol. 83, No. 14, pp. 2739-2741, Oct. 6, 2003.

Mehmet F. Yanik, Shanhui Fan, -Marin Soljacic,, J. D. Joannopoulos, and Yanik. "All-optical transistor action with bistable switching in a photonic crystal cross-waveguide geometry." Opt. Lett., vol. 28, No. 24, pp. 2506-2508, Dec. 15, 2003.

J. Bravo-Abad, A. W. Rodriguez, J. D. Joannopoulos, P. T. Rakich, S. G. Johnson, and M. Soljacic. "Efficient low-power terahertz generation via on-chip triply-resonant nonlinear frequency mixing." Appl. Phys. Lett., 96: 101110, 2010.

Kelley Rivoire, Ziliang Lin, Fariba Hatami, W. Ted Masselink, and Jelena Vuckovic. "Second harmonic generation in gallium phosphide photonic crystal nanocavities with ultralow continuous wave pump power." Opt. Express, vol. 17, No. 25, pp. 22609-22615, Dec. 7, 2009.

W. H. P. Pernice, C Xiong, C. Schuck, and H. X. Tang. "Second harmonic generation in phase matched aluminum-nitride waveguides and micro-ring resonators." Applied Physics Lett., 100(22), 2012.

Zhuan-Fang Bi, Alejandro W. Rodriguez, Hila Hashemi, David Duchesne, Marko Loncar, Ke-Ming Wang, and Steven G. Johnson. "High-efficiency second-harmonic generation in doubly-resonant x (2) microring resonators." Opt. Express, vol. 20, No. 7, pp. 7526-7543, Mar. 26, 2012.

Sonia Buckley, Marina Radulaski, Jingyuan Linda Zhang, Jan Petykiewicz, Klaus Biermann, and Jelena Vuckovic. "Multimode nanobeam cavities for nonlinear optics: high quality resonances separated by an octave." Opt. Express, vol. 22, No. 22, pp. 26498-26509, Nov. 3, 2014.

Alejandro Rodriguez, -Marin Soljacic, J. D. Joannopulos, and Steven G. Johnson. "x(2) and x(3) harmonic generation at a critical power in inhomogeneous doubly resonant cavities." Opt. Express, vol. 15, No. 12, pp. 7303-7318, 2007.

Vilson R. Almeida, Carlos A. Barrios, Roberto R. Panepucci, and Michal Lipson. "All-optical control of light on a silicon chip." Nature, vol. 431, pp. 1081-1084, Oct. 28, 2004.

Qianfan Xu and Michal Lipson. "Carrier-induced optical bistability in silicon ring resonators." Opt. Lett., vol. 31, No. 3, pp. 341-343, Feb. 1, 2006.

Jacob S. Levy, Mark A. Foster. Alexander L. Gaeta, and Michal Lipson. "Harmonic generation in silicon nitride ring resonators." Opt. Express, vol. 19, No. 12, pp 11415-11421, Jun. 6, 2011.

Parag B. Deotare, Munay W. McCutcheon, Ian W. Frank, Mughees Khan, and Marko Loncar. "High quality factor photonic crystal nanobeam cavities." Appl. Phys. Lett., 94:121106, 2009.

Vi. Lermer, N. Gregersen, F. Dunzer, S. Reitzenstein, S. Hofling, J. Mork, L. Worschech, M. Kamp, and A. Forchel. "Bloch-wave engineering of quantum dot micropillars for cavity quantum electrodynamics experiments." Phys. Rev. Lett., 108:057402, 2012.

Yinan Zhang and Marko Loncar. "Submicrometer diameter micropillar cavities with high quality factors and ultrasmall mode volumes." Opt. Lett. vol. 34, No. 7, Apr. 1, 2009.

M. Scalora, M. J. Bloemer, A. S. Manka, J. P. Dowling, C. M. Bowden, R. Viswanathan, and J. W. Haus. "Pulsed second-harmonic generation in nonlinear, one-dimensional, periodic structures." Phys. Rev. A, vol. 56, No. 4, pp. 3166-3174, Oct. 1997.

J. U. Furst, D. V Strekalov, D. Elser, M. Lassen, U. L. Andersen, C. Marquardt, and G. Leuchs. "Naturally phase-matched secondharmonic generation in a whispering-gallery-mode resonator." Phys. Rev. Lett., 104:153901, Apr. 16, 2010.

Severine Diziain, Reinhard Geiss, Matthias Zilk, Frank Schrempel, Ernst-Bernhard Kley, Andreas Tunnermann, and Thomas Pertsch. "Second harmonic generation in free-standing lithium niobate photonic crystal L3 cavity." Applied Physics Letters, vol. 103, No. 5, pp. 051117-1-051117-4, Jul. 2013.

(56) References Cited

OTHER PUBLICATIONS

Cheng Wang, Michael J. Burek, Zin Lin, Haig A. Atikian, Vivek Venkataraman, I-Chun Huang. Peter Stark, and Marko Loncar. "Integrated high quality factor lithium niobate microdisk resonators." Opt. Express, vol. 22, No. 25, pp. 30924-30933. Dec. 15, 2014.

Kuo P. S., Bravo-Abad J. and Solomon G. S. "Second-harmonic generation using 4-quasi-phasematching in a GaAs whispering-gallery-mode microcavity." Nature Comm.• 5(3109), 2014.

G. D. Miller, R. G. Batchko, W. M. Tulloch, D. R Weise, M. M. Fejer, and R. L. Byer. "42%-efficient single-pass cw second-harmonic generation in periodically poled lithium niobate." Opt. Lett., vol. 22, No. 24, pp. 1834-1836, 1997.

Woo Jun Kim and John D. O'Brien. "Optimization of a two-dimensional photonic-crystal waveguide branch by simulated annealing and the finite-element method." J Opt. Soc. Am. B, vol. 21, No. 2, pp. 289-295, Feb. 2004.

Behnam Saghirzadeh Darki and Nosrat Granpayeh. "Improving the perfomance of a photonic crystal ring-resonator-based channel drop filter using particle swarm optimization method." Optics Communications, vol. 283, No. 20, pp. 4099- 4103, 2010.

Momchil Minkov and Vincenzo Savona. "Automated optimization of photonic crystal slab cavities." Sci. Rep., 4(10.I038/srcp05I24), 2014.

Alexander Gondarenko, Stefan Preble, Jacob Robinson, Long Chen, Hod Lipson, and Michal Lipson. "Spontaneous emergence of periodic patterns in a biologically inspired simulation of photonic structures." Phys. Rev. Lett., 96:143904, Apr. 2006.

U.S. Jensen and O. Sigmund. "Topology optimization for nanophotonics." Laser and Photonics Reviews, 5(2):308-321, 2011.

Xiangdong Liang and Steven G. Johnson. "Formulation for scalable optimization of microcavities via the frequency-averaged local density of states." Opt. Express, 21(25):30812-30841, Dec. 2013.

David Liu, Lucas H. Gabrielli, Michal Lipson, and Steven G. Johnson. "Transformation inverse design." Opt. Express, 21(12):14223-14243, Jun. 2013.

Alexander Y. Piggott, Jesse Lu, Thomas M. Babinec, Konstantinos G. Lagoudakis, Jan Petykiewicz, and Jelena Vuckovic. "Inverse design and implementation of a wavelength demultiplexing grating coupler." Sci. Rep. , 4(10.1038/srep072.10), 2014.

Han Men, Karen Y K. Lee, Robert M. Freund, Jaime Peraire, and Steven G. Johnson. "Robust topology optimization of three-dimensional photonic-crystal band-gap structures." Optics Express, 22:22632-22648, Sep. 2014.

Fengwen Wang, Boyan Stefanov Lazarov, and Ole Sigmund. "On projection methods, convergence and robust formulations in topology optimization." Structural and Multidisciplinary Optimization, 43(6):767-784, 2011.

Krister Svanberg. "A class of globally convergent optimization methods based on conservative convex separable approximations." SIAM Journal on Optimization, vol. 12, No. 2, pp. 555-573, 2002.

M. H. MacDougal, P. D. Dapkus, A. E. Bond, C.-K Lin. and J. Geske, "Design and fabrication of VCSEL's with AlxOy-GaAs DBR's." IEEE Journal of Selected Topics in Quantum Electronics, vol. 3, No. 3, pp. 905-915, Jun. 1997.

M. Wu, G. Li, W. Yuen, and C. Chang-Hasnain. "Widely tunable 1.5 μm micromechanical optical filter using AlOx/AlGaAs DBR," Electronics Letters vol. 33, No. 20, pp. 1702-1704, Sep. 25, 1997.

Zin Lin, Xiangdong Liang, Steven G. Johnson, Marko Loncar and Aljandro W. Rodriguez. "Cavity-enhanced second-harmonic generation via nonlinear-overlap optimization" optica, vol. 3, No. 3, pp. 233-238, Mar. 1, 2016.

\* cited by examiner $E_{2y}$ $E_{1y}$ $E_{2y}$ $E_{1y}$

US 10,353,269 B2

MULTI-MODE CAVITIES FOR HIGH-EFFICIENCY NONLINEAR WAVELENGTH CONVERSION FORMED WITH OVERLAP OPTIMIZATION

CROSS-REFERENCE TO PRIOR FILED APPLICATIONS

This application claims priority to U.S. provisional application 62/300,516, filed Feb. 26, 2016, which is incorporated herein in its entirety.

STATEMENT REGARDING FEDERALLY SPONSORED RESEARCH OR DEVELOPMENT

This invention was made with government support under Grant No. DGE1144152 awarded by the National Science Foundation. The government has certain rights in the invention

FIELD OF THE INVENTION

The present disclosure generally relates to the field of micro/nano-scale devices and in more particular, micro/nano-scale devices which can be used for high-efficiency optical nonlinear wavelength conversion in multi-mode cavities.

BACKGROUND

High-efficiency coherent wavelength conversion is important to various areas of science and technology such as LEDs and lasers, spectroscopy, microscopy and quantum information processing. Current technologies employ wavelength converters with bulky nonlinear crystals (e.g. $LiNbO_3$) to convert light at readily available wavelengths to desired wavelengths. Developing ultra-compact converters with dimensions on the scale of the wavelength of light itself (sub-micron to a few microns) has been hampered by the lack of viable design techniques that can identify optimal geometries for such devices. This technique can automatically define optimal geometries that meet the stringent requirements of high-efficiency wavelength conversion in ultra-compact devices. A novel micro-post cavity with alternating material layers deployed in an unusual aperiodic sequence is used to support modes with the requisite frequencies, large lifetimes, small modal volumes, and extremely large overlaps. This leads to orders of magnitude enhancements in second harmonic generation. An important advantage of this technology is faster operational speeds (or more operational bandwidths) over current devices for comparable or even better performance.

SUMMARY OF THE INVENTION

A dual frequency optical resonator configured for optical coupling to light having a first frequency $\omega 1$ is disclosed. The dual frequency optical resonator includes a plurality of alternating layer pairs stacked in a post configuration, each layer pair having a first layer formed of a first material and a second layer formed of a second material, the first material and second materials being different materials. The first layer has a first thickness and the second layer has a second thickness, the thicknesses of the first and second layer being selected to create optical resonances at the first frequency $\omega 1$ and a second frequency $\omega 2$ which is a harmonic of $\omega 1$ and the thicknesses of the first and second layer also being selected to enhance nonlinear coupling between the first frequency $\omega 1$ and a second frequency $\omega 2$.

The second frequency $\omega 2$ may be a harmonic such as a second or third harmonic of the first frequency $\omega 1$. The thicknesses of the first and second layer may be selected to maximize the nonlinear coupling between the first frequency $\omega 1$ and a second frequency $\omega 2$. The first material may be AlGaAs and the second material may be $Al2O3$. The first and second layer may be formed in a deposition process.

Another dual frequency optical resonator configured for optical coupling to light having a first frequency $\omega 1$ is also disclosed. The dual frequency optical resonator includes a plurality of alternating layers pairs configured in a grating configuration, each layer pair having a first layer formed of a first material and a second layer formed of a second material, the first material and second materials being different materials. The first layer has a first thickness and the second layer has a second thickness, the thicknesses of the first and second layer being selected to create optical resonances at the first frequency $\omega 1$ and a second frequency $\omega 2$ which is a harmonic of $\omega 1$ and the thicknesses of the first and second layer also being selected to enhance nonlinear coupling between the first frequency $\omega 1$ and a second frequency $\omega 2$.

The second frequency $\omega 2$ may be a harmonic such as a second or third harmonic of the first frequency $\omega 1$. The thicknesses of the first and second layer may be selected to maximize the nonlinear coupling between the first frequency $\omega 1$ and a second frequency $\omega 2$. The first material may be AlGaAs and the second material may be $Al2O3$. The first material may be GaAs and the second material is $SiO2$. The first material may be LN and the second material may be air. The first and second layer may be formed in an etching process.

Another dual frequency optical resonator configured for optical coupling to light having a first frequency $\omega 1$ is also disclosed. The dual frequency optical resonator includes a plurality pixels configured in an X-Y plane, each pixel being formed of either a first material or a second material, the first material and second materials being different materials. The material for each pixel is selected such that the plurality of pixels create optical resonances at the first frequency cal and a second frequency $\omega 2$ which is a harmonic of $\omega 1$ and the material for each pixel is also selected such that the plurality of pixels enhance nonlinear coupling between the first frequency $\omega 1$ and a second frequency $\omega 2$.

The second frequency $\omega 2$ may be a harmonic such as a second or third harmonic of the first frequency cal. The material for each pixel may be selected such that the plurality of pixels maximize the nonlinear coupling between the first frequency $\omega 1$ and a second frequency $\omega 2$. The first material may be GaAs and the second material may be air. The first material may be LN and the second material may be air.

DETAILED DESCRIPTION

Figures 1A, 1B, 1C:
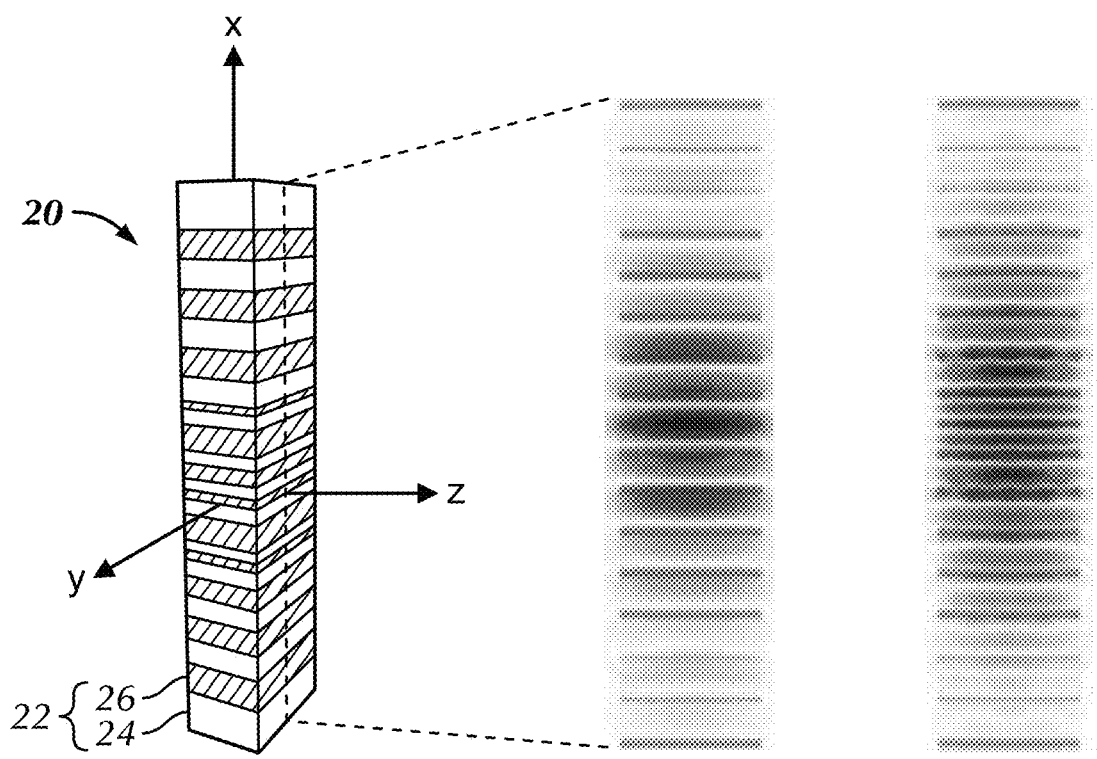
FIG. 1A is a block diagram of a dual frequency rectangular micropost cavity.
FIGS. 1B and 1C are graphs that plot the y-components of the electric fields in the xz-plane of the structure of FIG. 1A.
Figure 1D:
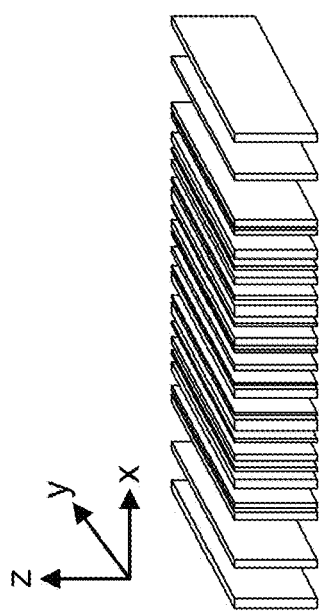
FIG. 1D is a dual frequency GaAs grating structure.

Nonlinear optical processes mediated by second-order ($\chi^{(2)}$) nonlinearities play a crucial role in many photonic applications, including ultra-short pulse shaping, spectroscopy, generation of novel frequencies and states of light and quantum information processing. Because nonlinearities are generally weak in bulk media, a well-known approach for lowering the power requirements of devices is to enhance nonlinear interactions by employing optical resonators that confine light for long times (dimensionless lifetimes Q) in small volumes V. Microcavity resonators designed for on-chip, infrared applications offer some of the smallest confinement factors available, but their implementation in practical devices has been largely hampered by the difficult task of identifying wavelength-scale ($V\sim\lambda^3$) structures supporting long-lived, resonant modes at widely separated wavelengths and satisfying rigid frequency-matching and mode-overlap constraints.

This disclosure is directed to scalable topology optimization of microcavities, where every pixel of the geometry is a degree of freedom and to the problem of designing wavelength-scale photonic structures for second harmonic generation (SHG). This approach is applied to obtain novel micropost, and grating microcavity designs supporting strongly coupled fundamental and harmonic modes at infrared and visible wavelengths with relatively large lifetimes $Q_1$, $Q_2>10^4$. In contrast to recently proposed designs based on known, linear cavity structures hand-tailored to maximize the Purcell factors or mode volumes of individual resonances, e.g. ring resonators and nanobeam cavities, the disclosed designs ensure frequency matching and small confinement factors while also simultaneously maximizing the SHG enhancement factor $Q^2Q_2|\bar{\beta}|^2$ to yield orders of magnitude improvements in the nonlinear coupling $\bar{\beta}$ and determined by a special overlap integral between the modes. These particular optimizations of multilayer stacks illustrate the benefits in an approachable and experimentally feasible setting, laying the framework for future topology optimization of 2D/3D slab structures that are sure to yield even further improvements.

TABLE I

SHG figures of merit for topology-optimized micropost and grating cavities of different material systems.

| Structure | $h_x \times h_y \times h_z$ ($\lambda_1^3$) | $\lambda$ (μm) | $(Q_1, Q_2)$ | $(Q_1^{rad}, Q_2^{rad})$ | $\bar{\beta}$ | $FOM_1$ | $FOM_2$ |
|---|---|---|---|---|---|---|---|
| (1) AlGaAs/Al$_2$O$_3$ micropost | 8.4 × 3.5 × 0.84 | 1.5-0.75 | (5000, 1000) | $1.4 \times 10^5, 1.3 \times 10^5$ | 0.018 | $7.5 \times 10^6$ | $8.3 \times 10^{11}$ |
| (2) GaAs gratings in SiO$_2$ | 5.4 × 3.5 × 0.60 | 1.8-0.9 | (5000, 1000) | $(5.2 \times 10^4, 7100)$ | 0.020 | $7 \times 10^6$ | $7.5 \times 10^9$ |
| (3) LN gratings in air | 5.4 × 3.5 × 0.80 | 0.8-0.4 | (5000, 1000) | (6700, 2400) | 0.030 | $8.4 \times 10^5$ | $9.7 \times 10^7$ |

Most experimental demonstrations of SHG in chip-based photonic systems operate in the so-called small-signal regime of weak nonlinearities, where the lack of pump depletion leads to the well-known quadratic scaling of harmonic output power with incident power. In situations involving all-resonant conversion, where confinement and long interaction times lead to strong nonlinearities and non-negligible down conversion, the maximum achievable conversion efficiency $$\left(\eta \equiv \frac{P_2^{out}}{P_1^{in}}\right), \tag{1}$$

$$\eta^{max} = \left(1 - \frac{Q_1}{Q_1^{rad}}\right)\left(1 - \frac{Q_2}{Q_2^{rad}}\right)$$

occurs at a critical input power, $$P_1^{crit} = \frac{2\omega_1\epsilon_0\lambda_1^3}{(\chi_{eff}^{(2)})^2|\bar{\beta}|^2Q_1^2Q_2}\left(1 - \frac{Q_1}{Q_1^{rad}}\right)^{-1}, \tag{2}$$

where $X_{eff}^{(2)}$ is the effective nonlinear susceptibility of the medium [SM], $$Q = \left(\frac{1}{Q^{rad}} + \frac{1}{Q^c}\right)^{-1}$$

is the dimensionless quality factor (ignoring material absorption) incorporating radiative decay $$\frac{1}{Q^{rad}}$$

and coupling to an input/output channel $$\frac{1}{Q^c}.$$

The dimensionless coupling coefficient $\bar{\beta}$ is given by a complicated, spatial overlap-integral involving the fundamental and harmonic modes [SM], $$\bar{\beta} = \frac{\int d_r \bar{\epsilon}(r) E_2^* E_1^2}{(\int dr \epsilon_1 |E_1|^2)(\sqrt{\int dr \epsilon_2 |E_2|^2})} \sqrt{\lambda_1^3}, \quad (3)$$

Where $\bar{\epsilon}(r)=1$ inside the nonlinear medium and zero elsewhere. Based on the above expressions one can define the following dimensionless figures of merit $$FOM_1 = Q_1^2 Q_2 |\bar{\beta}|^2 \left(1 - \frac{Q_1}{Q_1^{rad}}\right)^2 \left(1 - \frac{Q_2}{Q_2^{rad}}\right), \quad (4)$$

$$FOM_2 = (Q_1^{rad})^2 Q_2^{rad} |\bar{\beta}|^2. \quad (5)$$

where $FOM_1$ represents the efficiency per power, often quoted in the so-called undepleted regime of low-power conversion, and $FOM_2$ represents limits to power enhancement. Note that for a given radiative loss rate, $FOM_1$ is maximized when the modes are critically coupled, $$Q = \frac{Q^{rad}}{2},$$

with the absolute maximum occurring in the absence of radiative losses, $Q^{rad} \to \infty$, or equivalently, when $FOM_2$ is maximized. From either FOM, it is clear that apart from frequency matching and lifetime engineering, the design of optimal SHG cavities rests on achieving a large nonlinear coupling $\bar{\beta}$ (non-linear overlap).

Optimal Designs.—

Table I characterizes the FOMs of some of our newly discovered microcavity designs, involving simple micropost and gratings structures of various $\chi^{(2)}$ materials, including GaAs, AlGaAs and LiNbO$_3$. The low-index material layers of the microposts consist of alumina (Al$_2$O$_3$), while gratings are embedded in either silica or air (see supplement for detailed specifications). Note that in addition to their performance characteristics, these structures are also significantly different from those obtained by conventional methods in that traditional designs often involve rings, periodic structures or tapered defects, which tend to ignore or sacrifice $\bar{\beta}$ in favor of increased lifetimes and for which it is also difficult to obtain widely separated modes.

FIG. 1A is a block diagram of an optimized structure—a doubly-resonant rectangular micropost cavity (micropost resonator) 20 including a plurality of alternating layer pairs 22 stacked in a post configuration. The micropost resonator 20 in this example has only a single dimension of variation, the thickness of each layer. Each layer pair has a first layer 24 formed of a first material and a second layer 26 formed of a second material. The first material and second materials are different materials and in this example the micropost resonator 20 uses alternating AlGaAs/Al$_2$O$_3$ layers along with spatial profiles of the fundamental and harmonic modes. It differs from conventional microposts in that it does not use periodic bi-layers (e.g., based on a hand gap approach as the case would be in a DBR device) yet it supports two localized modes at precisely $\lambda_1=1.5$ μm and $\lambda_2=\lambda_1/2$. In addition to having large $Q^{rad} \gtrsim 10^5$ and small $V \sim (\lambda_1/n)^3$, the structure exhibits an ultra-large nonlinear coupling $\bar{\beta} \approx 0.018$ that is almost an order of magnitude larger than the best overlap found in the literature (see e.g., FIG. 2). From an experimental point of view, the micropost, system is of particular interest because it can be realized by a combination of existing fabrication techniques such as molecular beam epitaxy, atomic layer deposition, selective oxidation and electron-beam lithography. Additionally, the micropost cavity can be naturally integrated with quantum dots and quantum wells for cavity QED applications. Similar to other wavelength-scale structures, the operational bandwidths of these structures are limited by radiative losses in the lateral direction, but their ultra-large overlap factors more than compensate for the increased bandwidth, which ultimately may prove beneficial in experiments subject to fabrication imperfections and for large-bandwidth applications.

Figure 1F:
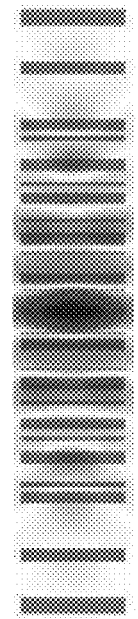
FIGS. 1F-1G are graphs that plot the y-components of the electric fields in the xz-plane of the structure of FIG. 1D.
Figure 1G:
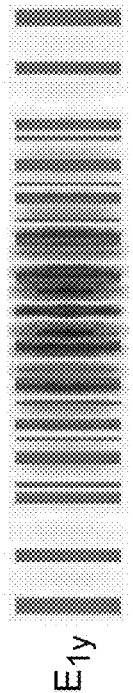
Figure 1E:
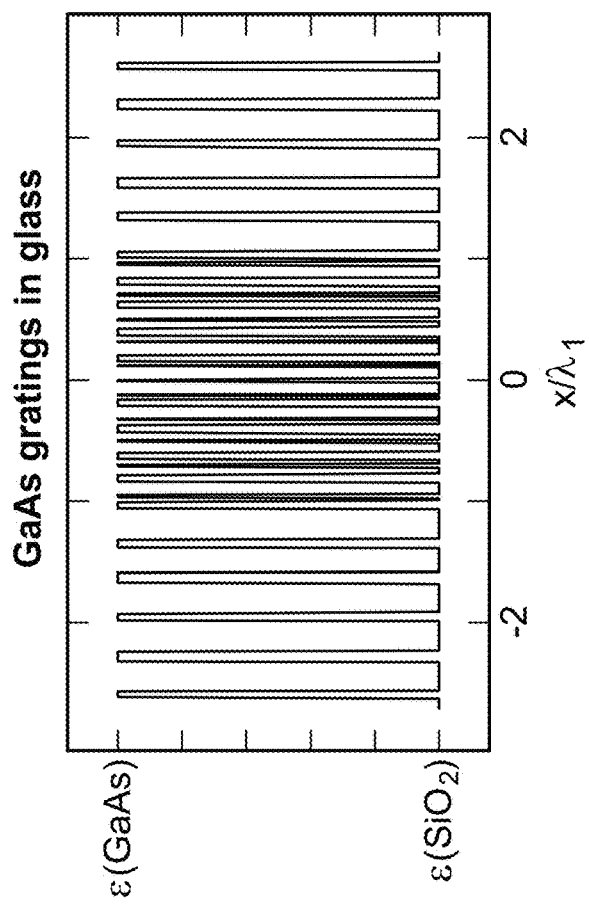
FIG. 1E is a graph of the cross-sectional dielectric profile of the structure of FIG. 1D.
Figure 1H:
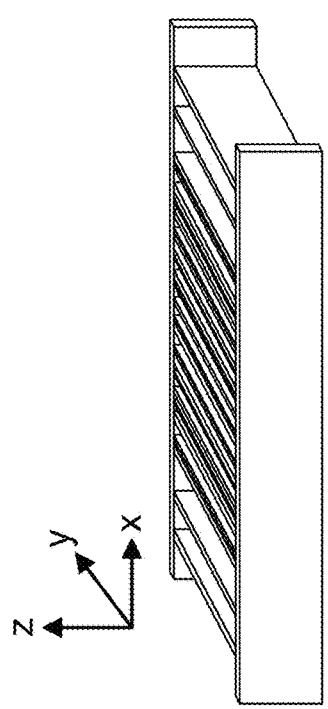
FIG. 1H is a dual frequency lithium-niobate (LN) grating structure in air.
Figure 1J:
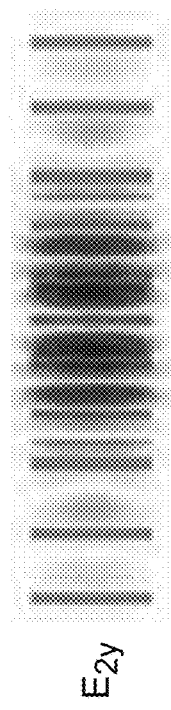
FIGS. 1J-1K are graphs that plot the y-components of the electric fields in the xz-plane of the structure of FIG. 1H.
Figure 1K:
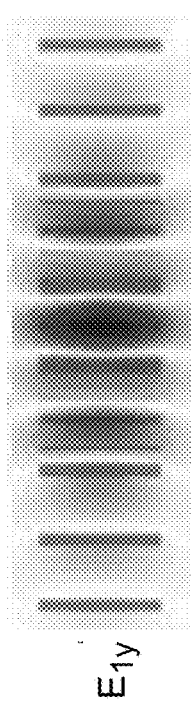
Figure 1I:
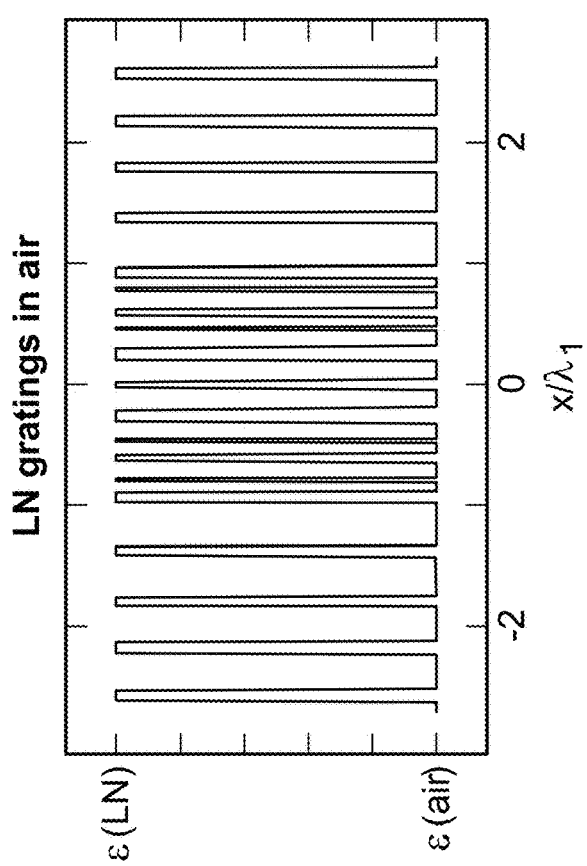
FIG. 1I is a graph of the cross-sectional dielectric profile of the structure of FIG. 1H.

It should be understood that other structures having a single dimension of freedom or multiple dimensions of freedom may be used without departing from the scope of this disclosure. For example, FIG. 1E is a graph of the cross-sectional dielectric profile of the structure of FIG. 1D. FIGS. 1F-1G are graphs that plot the y-components of the electric fields in the xz-plane of the structure of FIG. 1DC. FIG. 1I-1 is a dual frequency LN grating structure in air. FIG. 1I is a graph of the cross-sectional dielectric profile of the structure of FIG. 1H. FIGS. 1J-1K are graphs that plot the y-components of the electric fields in the xz-plane of the structure of FIG. 1H.

To understand the mechanism of improvement in $\bar{\beta}$, it is instructive to consider the spatial profiles of interacting modes. FIGS. 1B and 1C plot the y-components of the electric fields in the xz-plane against the background structure. Since $\bar{\beta}$ is a net total of positive and negative contributions coming from the local overlap factor $E_1^2 E_2$ in the presence of nonlinearity, not all local contributions are useful for SHG conversion. Most notably, one observes that the positions of negative anti-nodes of $E_2$ (light red regions) coincide with either the nodes of $E_1$ or alumina layers where $\chi^{(2)}=0$), minimizing negative contributions to the integrated overlap. In other words, improvements in $\bar{\beta}$ do not arise purely due to tight modal confinement but also from the constructive overlap of the modes enabled by the strategic positioning of field extrema along the structure.

Based on the tabulated FOMs (Table I), the efficiencies and power requirements of realistic devices can be directly calculated. For example, assuming $x_{\textit{eff}}^2$ (AlGaAs)~100 pm/V, the AlGaAs/Al$_2$O$_3$ micropost cavity (FIGS. 1A and 1B) yields an efficiency of $$\frac{P_{2,out}}{P_1^2} = 2.7 \times 10^4 / W$$

in the undepleted regime when the modes are critically coupled, $$Q = \frac{Q^{rad}}{2}.$$

For larger operational bandwidths, e.g. $Q_1=5000$ and $Q_2=1000$, we find that $$\frac{P_{2,out}}{P_1^2} = 16/W.$$

When the system is in the depleted regime and critically coupled, we find that a maximum efficiency of 25% can be achieved at $P_1^{crit} \approx 0.15$ mW whereas assuming smaller $Q_1=5000$ and $Q_2=1000$, a maximum efficiency of 96% can be achieved at $P_1^{crit} \approx 0.96$ W.

Figure 2:
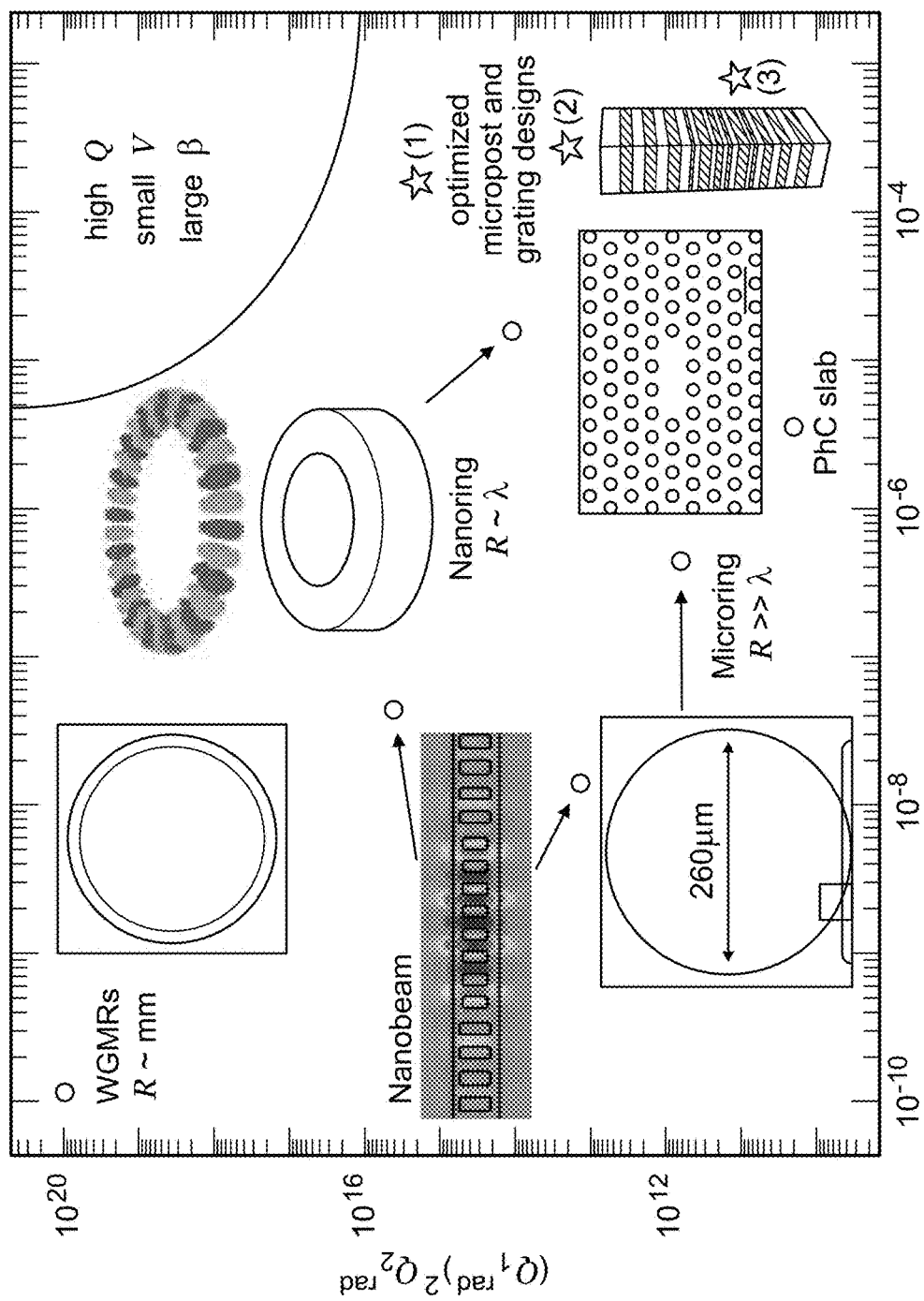
FIG. 2 is a graph showing a trend among various geometries towards increasing $\bar{\beta}$ and decreasing $Q^{rad}$ as device sizes decrease.

Comparison against previous designs.—Table II summarizes various performance characteristics, including the aforementioned FOM, for a handful of previously studied geometries with length-scales spanning from mm to a few wavelengths (microns). FIG. 2 demonstrates a trend among these geometries towards increasing $\bar{\beta}$ and decreasing $Q^{rad}$ as device sizes decrease. Maximizing $\bar{\beta}$ in millimeter-to-centimeter scale bulky media translates to the well-known problem of phase-matching the momenta or propagation constants of the modes. In this category, traditional WGMRs offer a viable platform for achieving high-efficiency conversion; however, their ultra-large lifetimes (critically dependent upon material-specific polishing techniques), large sizes (millimeter length-scales), and extremely weak nonlinear coupling (large mode volumes) render them far-from optimal chip-scale devices. Although miniature WGMRs such as microdisk and microring resonators show increased promise due to their smaller mode volumes, improvements in $\bar{\beta}$ are still hardly sufficient for achieving high efficiencies at low powers. Ultra-compact nanophotonic resonators such as the recently proposed nanorings, 2D pho-tonic crystal defects, and nanobeam cavities, possess even smaller mode volumes but prove challenging for design due to the difficulty of finding well-confined modes at both the fundamental and second harmonic frequencies. Even when two such resonances can be found by fine-tuning a limited set of geometric parameters, the frequency-matching constraint invariably leads to sub-optimal spatial overlaps which severely limits the maximal achievable $\bar{\beta}$.

Comparing Tables I and II, one observes that for a comparable Q, the topology-optimized structures perform significantly better in both $FOM_1$ and FOM2 than any conventional geometry, with the exception of the LN gratings, whose low $Q^{rad}$ lead to slightly lower FOM2. Generally, the optimized microposts and gratings perform better by virtue of a large and robust $\bar{\beta}$ which, notably, is significantly larger than that of existing designs. Here, we have not included in our comparison those structures which achieve non-negligible SHG by special poling techniques and/or quasi-phase matching methods, though their performance is still sub-optimal compared to the topology-optimized designs. Such methods are highly material-dependent and are thus not readily applicable to other material platforms; instead, ours is a purely geometrical topology optimization technique applicable to any material system.

Optimization Formulation:

Optimization techniques have been regularly employed by the photonic device community, primarily for fine-tuning the characteristics of a pre-determined geometry; the majority of these techniques involve probabilistic Monte-Carlo algorithms such as particle swarms, simulated annealing and genetic algorithms. While some of these gradient-free methods have been used to uncover a few unexpected results out of a limited number of degrees of freedom (DOF), gradient-based topology optimization methods efficiently handle a far larger design space, typically considering every pixel or voxel as a DOF in an extensive 2D or 3D computational domain, giving rise to novel topologies and geometries that might have been difficult to conceive from conventional intuition alone. The early applications of topology optimization were primarily focused on mechanical problems and only recently have they been expanded to consider photonic systems, though largely limited to linear device designs.

TABLE II

| Structure | λ (μm) | $(Q_1, Q_2)$ | $(Q_1^{rad}, Q_2^{rad})$ | $\bar{\beta}$ | $FOM_1$ | $FOM_2$ |
|---|---|---|---|---|---|---|
| LN WGM resonator | 1.064-0.532 | $(3.4 \times 10^7, —)$ | $(6.8 \times 10^7, —)$ | — | $\sim 10^{10}$ | — |
| AlN microring | 1.55-0.775 | $(\sim 10^4, \sim 5000)$ | — | — | $2.6 \times 10^5$ | — |
| GaP PhC slab* | 1.485-0.742 | $(\approx 6000, —)$ | — | — | $\approx 2 \times 10^5$ | — |
| GaAs PhC nanobeam | 1.7-0.91† | (5000, 1000) | $(>10^6, 4000)$ | 0.00021 | 820 | $1.8 \times 10^8$ |
|  | 1.8-0.91 | (5000, 1000) | $(6 \times 10^4, 4000)$ | 0.00012 | 227 | $2.1 \times 10^5$ |
| AlGaAs nanoring | 1.55-0.775 | (5000, 1000) | $(10^4, >10^6)$ | 0.004 | $10^5$ | $1.6 \times 10^9$ |

Table II includes SHG figures of merit, including the frequencies λ, overall and radiative quality factors Q, $Q^{rad}$ and nonlinear coupling $\bar{\beta}$ of the fundamental and harmonic modes, of representative geometries. Also shown are the $FOM_1$ and $FOM_2$ figures of merit described in equations (4) and (5).

* SHG occurs between a localized defect mode (at the fundamental frequency) and an extended index guided mode of the PhC.

† Resonant frequencies are mismatched.

A high level example of a suitable computation system generally proceeds as follows:

1(a) define a grid of degrees of freedom (DOF). 1(b) assign permittivity (material property) to each DOF. 2(a) place a dipole current source $J_1$ at $\omega_1$ in the domain and compute a relative electric field $E_1$ by solving Maxwell's equations. 2(b) compute the derivative of $E_1$ with respect to each DOF. 3(a) using $E_1$ at $\omega 1$, compute the work done by the electric field on the current source ($P=E_1 \cdot J_1$). 3b) compute the field $E_2$ due to current source J2 at $\omega_2$ (e.g., 2 $\omega_1$ for the $2^{nd}$ harmonic) by solving Maxwell's equations. 3(c) compute the work done by the electric field on the current source ($P=E_2 \cdot J_2$). 4 maximize 3(c) and 3(a). In this example $\bar{\beta}$ is proportional to 3(c) and 3(a) and 3(c) also ensure that there are 2 resonances at $\omega_1$ and $\omega_2$.

In what follows, we describe a system for gradient-based topology optimization of nonlinear wavelength-scale frequency converters. Previous approaches exploited the equivalency between LDOS and the power radiated by a point dipole in order to reduce Purcell-factor maximization problems to a series of small scattering calculations. Defining the objective $\max_{\bar{\in}} f(\bar{\in}(r); \omega) = -\text{Re}[\int dr\, J^* \cdot E]$ it follows that E can be found by solving the frequency domain Maxwell's equations $ME=i\omega J$, where M is the Maxwell operator [SM] and $J=\delta(r-r_0)\hat{e}j$. The maximization is then performed over a finely discretized space defined by the normalized dielectric function $\{\bar{\in}_\alpha = \bar{\in}(r_\alpha), \alpha \leftrightarrow (i\Delta x, j\Delta y, k\Delta z)\}$. An important realization is that instead of maximizing the LDOS at a single discrete frequency $\omega$, a better-posed problem is that of maximizing the frequency-averaged $f$ in the vicinity of $\omega$, denoted by $\langle f \rangle = \int d\omega'\, W(\omega'; \omega, \Gamma) f(\omega')$, where W is a weight function defined over some specified bandwidth Γ. Using contour integration techniques, the frequency integral can be conveniently replaced by a single evaluation of $f$ at a complex frequency $\omega+i\Gamma$. For a fixed $\Gamma$, the frequency average effectively shifts the algorithm in favor of minimizing V over maximizing Q; the latter can be enhanced over the course of the optimization by gradually winding down the averaging bandwidth $\Gamma$. A major merit of the frequency-averaged LDOS formulation is that it features a mathematically well-posed objective as opposed to a direct maximization of the cavity Purcell factor Q, allowing for rapid convergence of the optimization algorithm into an extremal solution.

An extension of the optimization problem from single to multimode cavities maximizes the minimum of a collection of LDOS at different frequencies. Applying such an approach to the problem of SHG, the optimization objective becomes: $\max_{\overline{\in}_\alpha}$ min [LDOS($\omega_1$), LDOS($2\omega_2$)] which would require solving two separate scattering problems, $M_1 E_1 = J_1$ and $M_2 E_2 = J_2$, for the two distinct point sources $J_1$, $J_2$ at $\omega_1$ and $\omega_2 = 2\omega_1$ respectively. However, as discussed before, rather than maximizing the Purcell factor at individual resonances, the key to realizing optimal SHG is to maximize the overlap integral $\bar{\beta}$ between $E_1$ and $E_2$. Here, we disclose an elegant way to incorporate $\bar{\beta}$ by coupling the two scattering problems. In particular, we consider not a point dipole but an extended source $J_2 \sim E_1^2$ at $\omega_2$ and optimize a single combined radiated power $f=\text{Re}[\int dr\, J_2^* \cdot E_2]$ instead of two otherwise unrelated LDOS. The advantage of this approach is that $f$ yields precisely the $\bar{\beta}$ parameter along with any resonant enhancement factors (~Q/V) in $E_1$ and $E_2$. Intuitively, $J_2$ can be thought of as a nonlinear polarization current induced by $E_1$ in the presence of the second order susceptibility tensor $X^{(2)}$, and in particular is given by $J_{2i} = \overline{\in}(r) \Sigma_{jk} x_{ijk}^{(2)} E_{1j} E_{1k}$ where the indices i, j, k run over the Cartesian coordinates. In general, $x_{ijk}^{(2)}$ mixes polarizations and hence $f$ is a sum of different contributions from various polarization-combinations. In what follows and for simplicity, we focus on the simplest case in which $E_1$ and $E_2$ have the same polarization, corresponding to a diagonal $X^{(2)}$ tensor determined by a scalar $x_{eff}^{(2)}$. Such an arrangement can be obtained for example by proper alignment of the crystal orientation axes [SM]. With this simplification, the generalization of the linear topology-optimization problem to the case of SHG becomes:

$$\max_{\overline{\in}_\alpha} \langle f(\overline{\in}_\alpha; \omega_1) \rangle = -Re\left[\left\langle \int J_2^* \cdot E_2 dr \right\rangle\right], \quad (6)$$

$$M_1 E_1 = i\omega_1 J_1,$$

$$M_2 E_2 = i\omega_2 J_2, \omega_2 = 2\omega_1$$

where $$J_1 = \delta(r_\alpha - r_0)\hat{e}_j, j \in \{x, y, z\}$$

$$J_2 = \overline{\in}(r_\alpha) E_{1j}^2 \hat{e}_j,$$

$$M_l = \nabla \times \frac{1}{\mu} \nabla \times -\epsilon_l(r_\alpha)\omega_l^2, l = 1, 2$$

$$\epsilon_l(r_\alpha) = \epsilon_m + \overline{\in}_\alpha(\epsilon_{dl} - \epsilon_m), \overline{\in}_\alpha \in [0, 1],$$

and where $\in_d$ denotes the dielectric contrast of the nonlinear medium and $\in_m$ is that of the surrounding linear medium. Note that $\overline{\in}_\alpha$ is allowed to vary continuously between 0 and 1 whereas the intermediate values can be penalized by so-called threshold projection filters. The scattering framework makes it straightforward to calculate the derivatives of $f$ (and possible functional constraints) with respective to $\overline{\in}_\alpha$ via the adjoint variable method. The optimization problem can then be solved by any of the many powerful algorithms for convex, conservative, separable approximations, such as the well-known method of moving asymptotes.

Figure 3A:
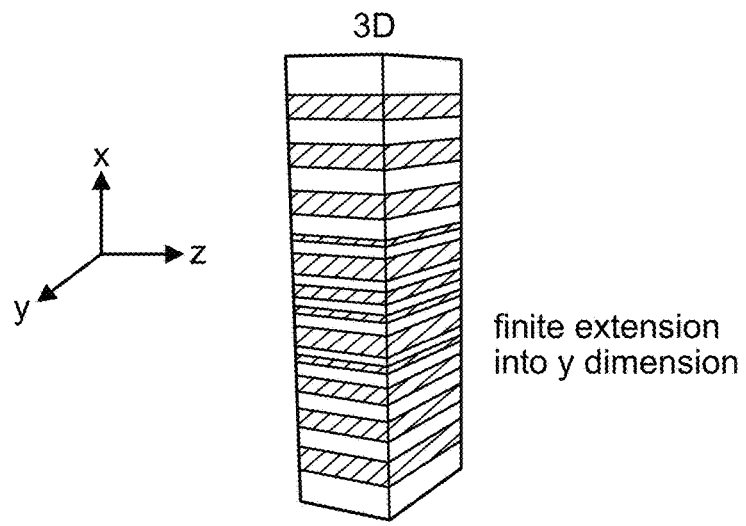
FIGS. 3A-3C show a block diagram of the work flow of the design process.
Figure 3B:
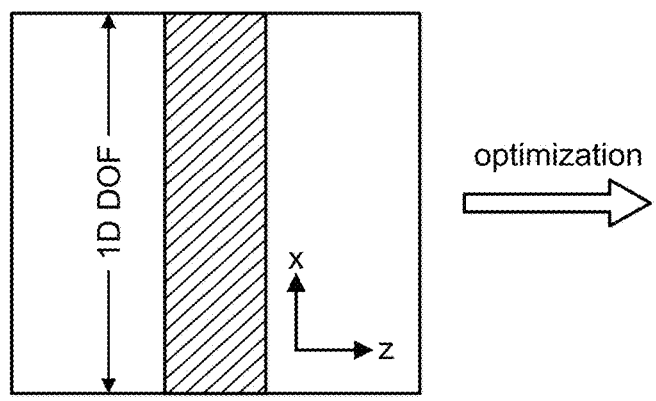
Figure 3C:
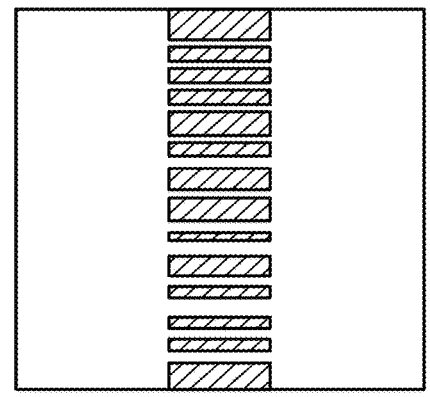

FIG. 3 is a block diagram of the work flow of the design process. The degrees of freedom in our problem consist of all the pixels along x-direction in a 2D computational domain. Starting from the vacuum or a uniform slab, the optimization seeks to develop an optimal pattern of material layers (with a fixed thickness in the z-direction) that can tightly confine light at the desired frequencies while ensuring maximal spatial overlap between the confined modes. The developed 2D cross-sectional patterns is truncated at a finite width in the y-direction to produce a fully three-dimensional micropost or grating cavity which is then simulated by FDTD methods to extract the resonant frequencies, quality factors, eigenmodes and corresponding modal overlaps. Here, it must be emphasized that we merely performed one-dimensional optimization (within a 2D computational problem) because of limited computational resources; consequently, our design space is severely constrained.

For computational convenience, the optimization is carried out using a 2D computational cell (in the xz-plane), though the resulting optimized structures are given a finite transverse extension $h_y$ (along the y direction) to make realistic 3D devices (see e.g., FIG. 3). In principle, the wider the transverse dimension, the better the cavity quality factors since they are closer to their 2D limit which only consists of radiation loss in the z direction; however, as $h_y$ increases, $\bar{\beta}$ decreases due to increasing mode volumes. In practice, we chose $h_y$ on the order of a few vacuum wavelengths so as not to greatly compromise either Q or $\bar{\beta}$. We then analyze the 3D structures via rigorous FDTD simulations to determine the resonant lifetimes and modal overlaps. By virtue of our optimization scheme, we invariably find that frequency matching is satisfied to within the mode linewidths. We note that our optimization method seeks to maximize the intrinsic geometric parameters such as $Q^{rad}$ and $\bar{\beta}$ of an un-loaded cavity whereas the loaded cavity lifetime Q depends on the choice of coupling mechanism, e.g. free-space, fiber, or waveguide coupling, and is therefore an external parameter that can be considered independently of the optimization. When evaluating the performance characteristics such as $FOM_1$, we assume total operational lifetimes $Q_1=5000$, $Q_2=1000$. In the optimized structures, it is interesting to note the appearance of deeply sub-wavelength features $$\sim 1 - 5\% \text{ of } \frac{\lambda_1}{n},$$

creating a kind of metamaterial in the optimization direction; these arise during the optimization process regardless of starting conditions due to the low-dimensionality of the problem. We find that these features are not easily removable as their absence greatly perturbs the quality factors and frequency matching.

The computational framework discussed above is based on largescale topology-optimization (TO) techniques that enable automatic discovery of multilayer and grating structures exhibiting some of the largest SHG figures of merit ever predicted. It is also possible to extend the TO formulation to allow the possibility of more sophisticated nonlinear processes and apply it to the problem of designing rotationally symmetric and slab microresonators that exhibit high-efficiency second harmonic generation (SHG) and sum/difference frequency generation (SFG/DFG). In particular, disclosed herein are multi-track ring resonators and proof-of-principle two-dimensional slab cavities supporting multiple, resonant modes (even several octaves apart) that would be impossible to design "by hand". The disclosed designs ensure frequency matching, long radiative lifetimes, and small (wavelength-scale) modal confinement while also simultaneously maximizing the nonlinear modal overlap (or "phase matching") necessary for efficient NFC. For instance, disclosed herein are topology-optimized concentric ring cavities exhibiting SHG efficiencies as high as $P_2/P_1^2=1.3 \times 10^{25}$ $(\chi^{(2)})^2[W^{-1}]$ even with low operational $Q \sim 10^4$, a performance that is on a par with recently fabricated 60 μm-diameter, ultrahigh $Q \sim 10^6$ AlN microring resonators $(P_2/P_1^2=1.13 \times 10^{24}$ $(\chi^{(2)})^2[W^{-1}])$; essentially, our topology-optimized cavities not only possess the smallest possible modal volumes $\sim (\lambda/n)^3$, but can also operate over wider bandwidths by virtue of their increased nonlinear modal overlap.

A typical topology optimization problem seeks to maximize or minimize an objective function $f$, subject to certain constraints $g$, over a set of free variables or degrees of freedom (DOF):

$$\max/\min f(\overline{\epsilon}_\alpha) \quad (1)$$

$$g(\overline{\epsilon}_\alpha) \leq 0 \quad (2)$$

$$0 \leq \overline{\epsilon}_\alpha \leq 1 \quad (3)$$

where the DOFs are the normalized dielectric constants. $\overline{\epsilon}_\alpha \in [0,1]$ assigned to each pixel or voxel (indexed $\alpha$) in a specified volume. The subscript $\alpha$ denotes appropriate spatial discretization $r \to (i,j,k)_\alpha \Delta$ with respect to Cartesian or curvilinear coordinates. Depending on the choice of background (bg) and structural materials, $\overline{\epsilon}_\alpha$ is mapped onto position-dependent dielectric constant via $\epsilon_\alpha = (\epsilon - \epsilon_{bg}) \overline{\epsilon}_\alpha + \epsilon_{bg}$. The binarity of the optimized structure is enforced by penalizing the intermediate values $\overline{\epsilon} \in (0,1)$ or utilizing a variety of filter and regularization methods. Starting from a random initial guess or completely uniform space, the technique discovers complex structures automatically with the aid of powerful gradient-based algorithms such as the method of moving asymptotes (MMA). For an electromagnetic problem, $f$ and $g$ are typically functions of the electric E or magnetic H fields integrated over some region, which are in turn solutions of Maxwell's equations under some incident current or field. In what follows, we exploit direct solution of Maxwell's equations, $$\nabla \times \frac{1}{\mu} \nabla \times E - \epsilon(r)\omega^2 E = i\omega J, \quad (4)$$

describing the steady-state $E(r; \omega)$ in response to incident currents $J(r, \omega)$ at frequency $\omega$. While solution of (4) is straightforward and commonplace, an important aspect to making optimization problems tractable is to obtain a fast-converging and computationally efficient adjoint formulation of the problem. Within the scope of TO, this requires efficient calculations of the derivatives $$\frac{\partial f}{\partial \overline{\epsilon}_\alpha}, \frac{\partial g}{\partial \overline{\epsilon}_\alpha}$$

at every pixel $\alpha$, which we perform by exploiting the adjoint-variable method (AVM).

Any NFC process can be viewed as a frequency mixing scheme in which two or more constituent photons at a set of frequencies $\{\omega_n\}$ interact to produce an output photon at frequency $\Omega = \Sigma_n c_n w_n$, where $\{c_n\}$ can be either negative or positive, depending on whether the corresponding photons are created or destroyed in the process. Given an appropriate nonlinear tensor component $\chi_{ijk}$ ..., with i, j, k, ... $\in \{x, y, z\}$, mediating an interaction between the polarization components $E_i(\Omega)$ and $E_{1j}, E_{2k}, \ldots$, we begin with a collection of point dipole currents, each at the constituent frequency $\omega_n$, $n \in \{1, 2, \ldots\}$ and positioned at the center of the computational cell r', such that $J_n = \hat{e}_{nv} \delta(r-r')$, where $\hat{e}_{nv} \in \{\hat{e}_{1j}, \hat{e}_{2k}, \ldots\}$ is a polarization vector chosen so as to excite the desired electric field polarization components (v) of the corresponding mode. Given the choice of incident currents Jn, we solve Maxwell's equations to obtain the corresponding constituent electric-field response $E_n$, from which one can construct a nonlinear polarization current $J(\Omega) = \overline{\epsilon}(r) \Pi_n E_{nv}^{|c_n|(*)} \hat{e}_i$, where $E_{nv} = E_n \cdot \hat{e}_{nv}$, and $J(\Omega)$ can be generally polarized ($\hat{e}_1$) in a (chosen) direction that differs from the constituent polarizations $\hat{e}_{nv}$. Here, (*) denotes complex conjugation for negative $c_n$ and no conjugation otherwise. Finally, maximizing the radiated power, $-\text{Re}[\int R J(\Omega)^* \cdot E(\Omega) dr]$, due to $J(\Omega)$, one is immediately led to the following nonlinear topology optimization (NLTO) problem:

$$\max_{\overline{\epsilon}} f(\overline{\epsilon}; \omega_n) = -Re\left[\int J(\Omega)^* \cdot E(\Omega) dr\right], \quad (5)$$

$$M(\overline{\epsilon}, \omega_n) E_n = i\omega_n J_n, J_n = \hat{e}_{nv} \delta(r-r'),$$

$$M(\overline{\epsilon}, \Omega) E(\Omega) = i\Omega J(\Omega), J(\Omega) = \overline{\epsilon} \prod_n E_{nv}^{|c_n|(*)} \hat{e}_i,$$

$$M(\overline{\epsilon}, \omega) = \nabla \times \frac{1}{\mu} \nabla \times -\epsilon(r)\omega^2,$$

$$\epsilon(r) = \epsilon_m + \overline{\epsilon}(\epsilon_d - \epsilon_m), \overline{\epsilon} \in [0, 1].$$

Writing down the objective function in terms of the nonlinear polarization currents, it follows that solution of (5), obtained by employing any mathematical programming technique that makes use of gradient information, e.g. the adjoint variable method maximizes the nonlinear coefficient (mode overlap) associated with the aforementioned nonlinear optical process.

Figure 4B:
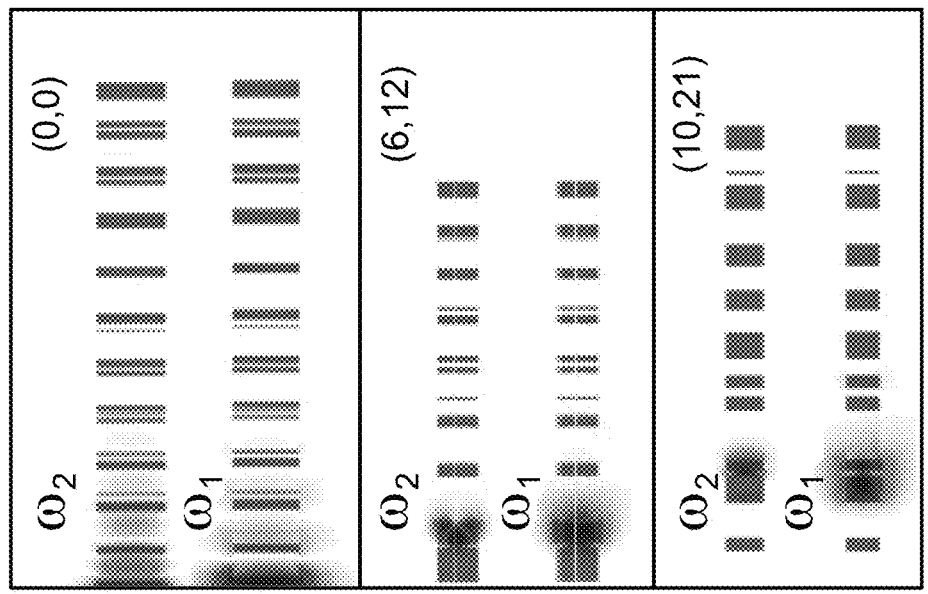
FIGS. 4A-4B are a schematic illustration of topology-optimized multitrack ring resonators.

Multi-track ring resonators—NLTO formulations may be applied to the design of rotationally symmetric cavities for SHG. A material platform may include gallium arsenide (GaAs) thin films cladded in silica. FIG. 4 is a schematic illustration of topology-optimized multitrack ring resonators. Also shown as the cross-sectional profiles of several ring resonators, along with those of fundamental and second harmonic modes corresponding to the azimuthal mode pairs (0,0), (6,12) and (10,21), whose increased lifetimes and modal interactions ß (Table III) via a $\chi^{(2)}$ process lead to increased SHG efficiencies. The result of the optimizations are described in FIG. 4 and Table III, the latter of which summarizes the most important parameters, classified according to the choice of $m_1$ and $m_2$, which denote the azimuthal mode numbers of fundamental and second harmonic modes, respectively. (Note that depending on the polarization of the two modes, different phase matching conditions must be imposed, e.g., $m_2=\{2m_1, 2m_1\pm1\}$, so in our optimizations we consider different possible combinations.) The parameter $\bar{\beta}$ is the nonlinear coupling strength between the interacting modes, which in the case of SHG is given by:

$$\bar{\beta} = \frac{\int d_r \bar{\epsilon}(r) E_2^* E_1^2}{(\int dr \epsilon_1 |E_1|^2)(\sqrt{\int dr \epsilon_2 |E_2|^2})} \sqrt{\lambda_1^3}, \quad (6)$$

TABLE III

| $(m_1, m_2)$ | Polarization | $Q_1$ | $Q_2$ | $\bar{\beta}\left(\frac{\chi^{(2)}}{4\sqrt{(\epsilon_0\lambda^3)}}\right)$ | Thickness $(\lambda_1)$ |
|---|---|---|---|---|---|
| (0, 0) | $(E_z, E_z)$ | $10^5$ | $3 \times 10^4$ | 0.041 | 0.39 |
| (4, 8) | $(E_z, E_z)$ | $3.1 \times 10^4$ | $3 \times 10^3$ | 0.009 | 0.30 |
| (5, 10) | $(E_z, E_r)$ | $8 \times 10^3$ | $3.7 \times 10^4$ | 0.008 | 0.18 |
| (6, 12) | $(E_z, E_z)$ | $9.5 \times 10^4$ | $2.7 \times 10^4$ | 0.008 | 0.18 |
| (10, 20) | $(E_z, E_z)$ | $10^6$ | $1.2 \times 10^4$ | 0.004 | 0.22 |
| (10, 21) | $(E_z, E_r)$ | $1.6 \times 10^6$ | $7.4 \times 10^4$ | 0.004 | 0.24 |

Table III shows the SHG figures of merit, including azithmuthal numbers $m_{1,2}$, field polarizations, lifetimes $Q_{1,2}$, and nonlinear coupling $\bar{\beta}$, in units of $\chi^{(2)}/4\sqrt{(\epsilon_0\lambda^3)}$, corresponding to the fundamental and harmonic modes of various topology-optimized multi-track ring resonators, with cross-sections (illustrated in FIG. 4) determined by the choice of thicknesses, given in units of $\lambda_1$.

TABLE IV

| $\omega_1:\omega_2:\omega_3$ | $(m_1, m_2, m_3)$ | Polarization | $(Q_1, Q_2, Q_3)$ | $\bar{\beta}\left(\frac{\chi^{(2)}}{4\sqrt{(\epsilon_0\lambda^3)}}\right)$ | Thickness $(\lambda_1)$ |
|---|---|---|---|---|---|
| 1:1.2:2.2 | (0, 0, 0) | $(E_z, E_z, E_z)$ | $(1.8 \times 10^4, 1.4 \times 10^4, 7800)$ | 0.031 | 0.38 |

Table IV shows Similar figures of merit as in Table III, but for multi-track rings designed to enhance a SFG process involving light at $\omega_1=\omega_3-\omega_2$, $\omega_2=1.2\omega_1$, and $\omega_3=2.2\omega_1$, with $\bar{\beta}$.

FIGS. 5A-5D show the statistical distribution of lifetimes $Q_{1,2}$, frequency mismatch $\Delta\omega=|\omega_1-\omega_2/2|$, and nonlinear coupling ß, corresponding to the multi-track ring of FIG. 4 associated with the azimuthal mode pair (6, 12). The positions of every interface is subject to random variations of maximum extent ±36 nm (blue line) or ±54 nm (red line).

In Table. IV, we also consider resonators optimized to enhance a SFG process involving three resonant modes, $\omega_1=\omega_3-\omega_2$, with $\omega_2=1.2\omega_1$ and $\omega_3=2.2\omega_1$. Note that two of these modes are more than an octave apart.

Figure 4A:
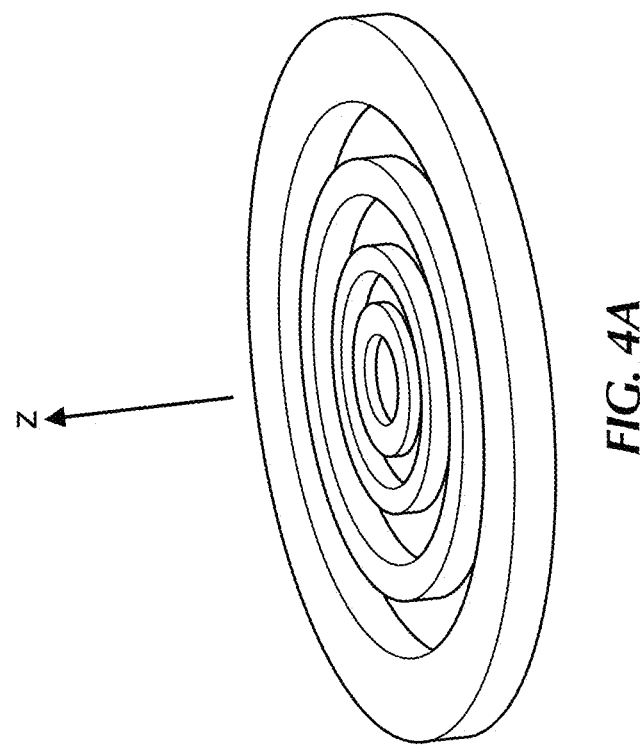
Figure 5A:
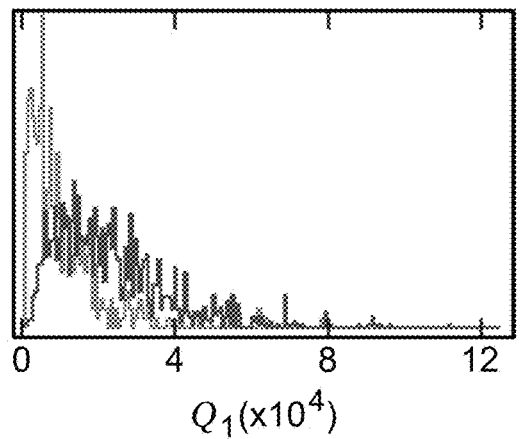
FIGS. 5A-5D show the statistical distribution of lifetimes Q1,2, frequency mismatch $\Delta\omega=|\omega1-\omega2/2|$, and nonlinear coupling ß, corresponding to the multi-track ring of FIG. 4 associated with the azimuthal mode pair (6, 12)
Figure 5B:
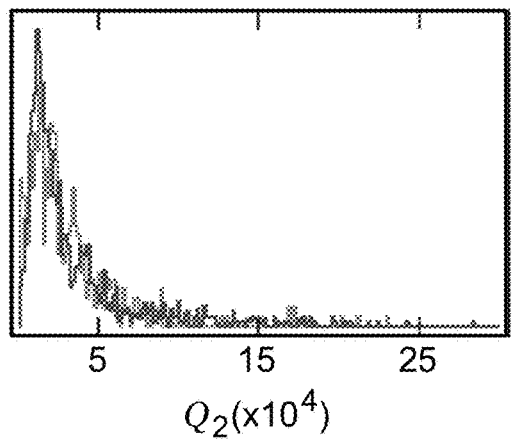
Figure 5C:
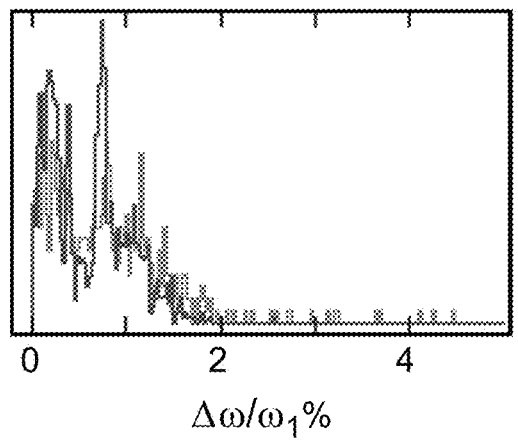
Figure 5D:
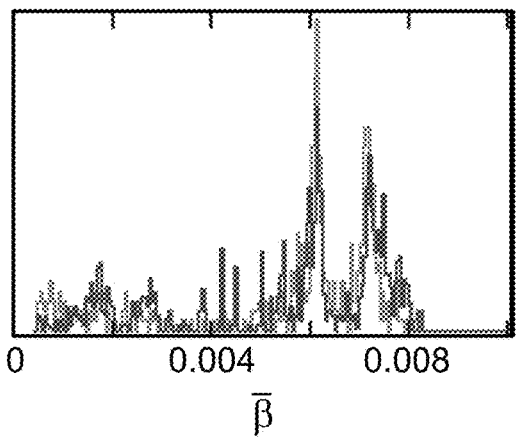

The resulting structures and figures of merit suggest the possibility of orders of magnitude improvements. In particular, we find that the largest overlap factors $\bar{\beta}$ are achieved in the case $m_1=m_2=0$, corresponding to highly confined modes with peak amplitudes near the center of the rings [FIG. 4A], in which case a relatively thicker cavity$\approx 0.42\lambda_1$ is required to mitigate out of plane radiation losses. From the optimized Q's and $\bar{\beta}$ and assuming $\lambda_1=1.55$ µm, we predict a SHG efficiency of $P2/P_1^2=1.3\times10^{25}$ $(\chi^{(2)})^2[W^{-1}]$. As expected, both radiative losses and $\bar{\beta}$ decrease with increasing m, as the modes become increasingly delocalized and move away from the center, resulting in larger mode volumes. Compared to the state-of-the-art microring resonator, whose ß$\sim 10^{-3}$, our structures exhibit consistently larger overlaps, albeit with decreased radiative lifetimes. The main challenge in realizing multi-track designs is that, like photonic crystals and related structures that rely on careful interference effects, their Qs tend to be more sensitive to perturbations. In the case of centrally confined modes with $m_1=m_2=0$, we observe the appearance of deeply subwavelength features near the cavity center where the fields are mostly confined. We find that these features are crucial to the integrity of the modes since they are responsible for the delicate interference process which cancels outgoing radiation, and therefore their absence greatly reduces the quality factors of the modes. Overall, for $m_1=m_2=0$, we find that for operation with $\lambda_1\sim 1.55$ µm, a fabrication precision of several nanometers would be necessary to ensure quality factors on the order of $10^5$. On the other hand, the optimized designs become increasingly robust for larger $m_1, m_2 >> 0$ since they have fewer subwavelength features and smaller aspect ratios. FIG. 4 shows distributions of the most important figures of merit for an ensemble of ($m_1=6$, $m_2=12$) cavities subject to random, uniformly-distributed structural (position and thicknesses) perturbations in the range [−50, 50] nm. We find that while the frequency mismatch and overlap factors are quite robust against variations, the quality factors can decrease to $\sim 10^4$.

Slab Microcavities—

Figure 6:
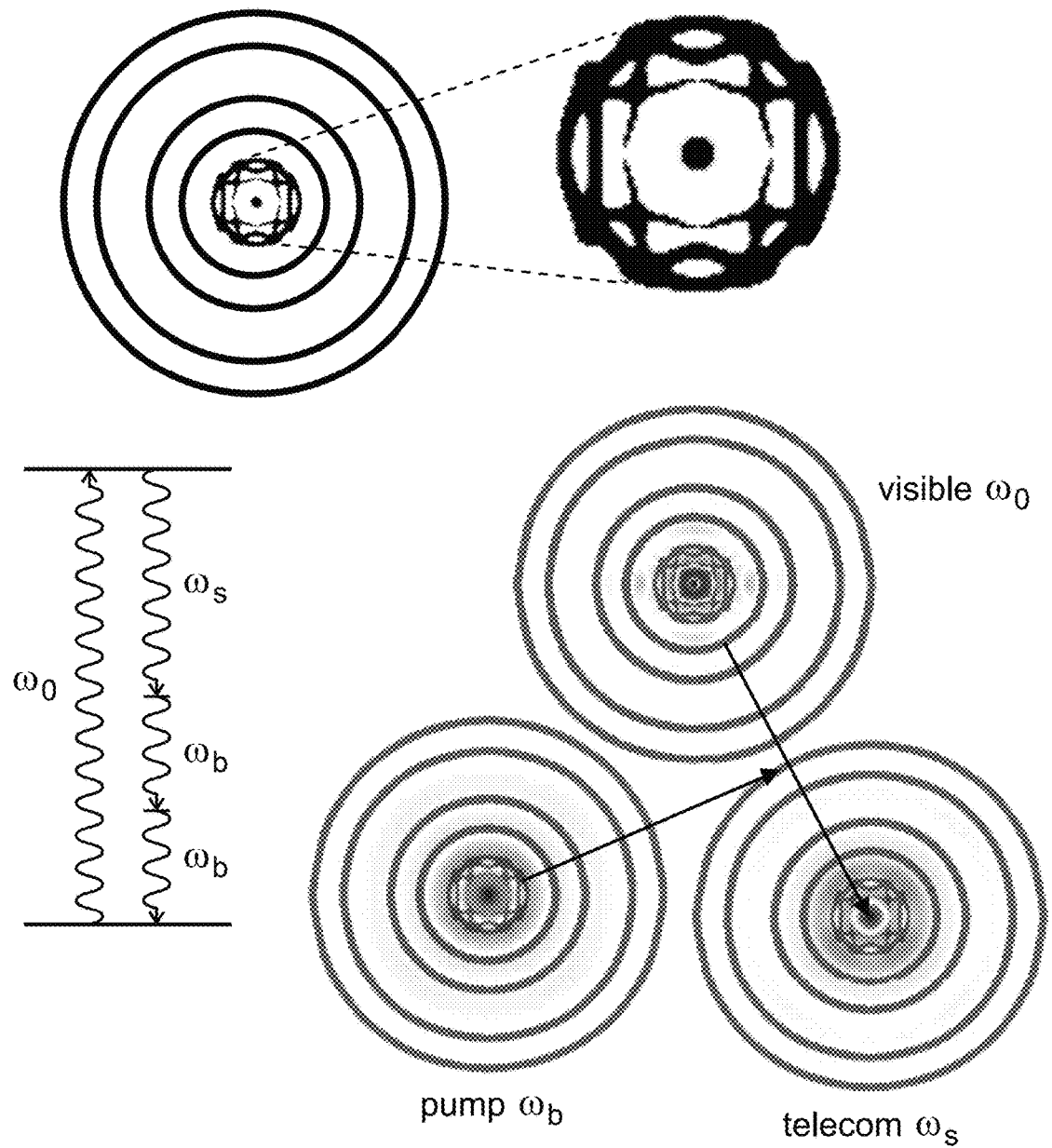
FIG. 6 presents a proof-of-concept 2D design that satisfies all of these requirements.

We now consider a different class of structure and NFC process, namely DFG in slab microcavities. In particular, we consider a $\chi^{(3)}$ nonlinear process satisfying the frequency relation $\omega_s=\omega_0-2\omega_b$, with $\omega_s$, $\omega_0$, and $\omega_b$ denoting the frequencies of signal, emitted, and pump photons (see FIG. 6). Such a DFG process has important implications for single-photon frequency conversion, e.g. in nitrogen vacancy (NV) color centers, where a single NV photon $\lambda_0=637$ nm is converted to a telecommunication wavelength $\lambda_s=1550$ nm by pump light at $\lambda_b\sim 2200$ nm, requiring resonances that are more than two octave away from one another. In other words, the challenge is to design a diamond cavity (n$\approx$2.4) that exhibits three widely separated strongly confined modes with large nonlinear interactions and lifetimes. FIG. 6 presents a proof-of-concept 2D design that satisfies all of these requirements. Extension to 3D slabs of finite thickness (assuming similar lateral profiles and vertical confinement$\sim$wavelength), one is led to the possibility of ultra-large $\bar{\beta}\sim 0.2$, with $$\bar{\beta} = \frac{\int d_r \bar{\epsilon}(r) E_0^* E_b^2 E_s}{\sqrt{\int dr \epsilon_1 |E_0|^2} \sqrt{\int dr \epsilon_s |E_s|^2} (\int dr \epsilon_b |E_b|^2)} \lambda_1^3 \quad (7)$$

FIG. 6 shows a topology optimized 2D microcavity exhibiting tightly confined and widely separated modes ($\omega_s$, $\omega_b$, $\omega_0$) that are several octaves apart. The modes interact strongly via a $\chi^{(3)}$ DFG scheme dictated by the frequency relation $\omega_s=\omega_0-2\omega_b$, with $\omega_0=2.35\omega_s$ and $\omega_b=0.68\omega_s$, illustrated by the accompanying two-level schematic.

Note that the lifetimes of these 2D modes are bounded only by the finite size of our computational cell (and hence are ignored in our discussion), whereas in realistic 3D microcavities, they will be limited by vertical radiation losses. Despite the two-dimensional aspect of this slab design, and in contrast to the fully 3D multitrack ring resonators above, these results provide proof of the existence of wavelength-scale photonic structures that can greatly enhance challenging NFC processes. One example is the NV problem described above, which is particularly challenging if a monolithic all-diamond approach is desired, in which case both single-photon emission and wavelength conversion are to be seamlessly realized in the same diamond cavity. A viable solution that was recently proposed is the use of four-wave mixing Bragg scattering (FWM-BS) by way of whispering gallery modes, which are relatively easy to phase-match but suffer from large mode volumes. Furthermore, FWM-BS requires two pump lasers, at least one of which has a shorter wavelength than the converted signal photon, which could lead to spontaneous down-conversion and undesirable noise, degrading quantum fidelity, in contrast to the DFG scheme above, based on a long-wavelength pump.

Figures 7A, 7B, 7C, 7D:
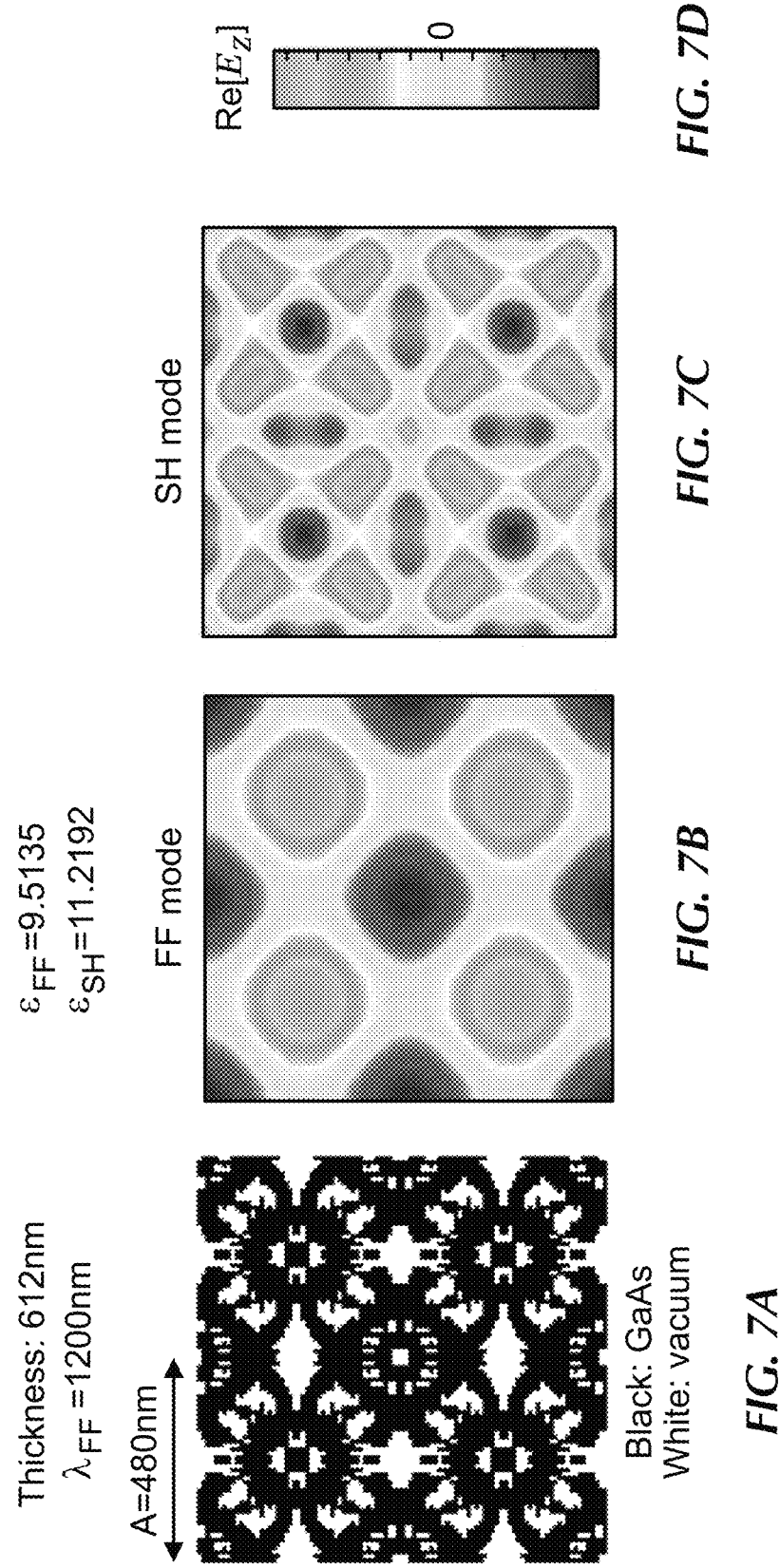
FIG. 7A is a diagram of a large-area (non-cavity based) device.
FIG. 7B-7C are graphs that plot the FF mode and SH modes of the structure of FIG. 7A.
FIG. 7D is a graph that plots $Re[E_z]$ of the structure of FIG. 7A.

FIG. 7A is a diagram of a large-area (non-cavity based) device. FIGS. 7B-7C are graphs that plot the FF mode and SH modes of the structure of FIG. 7A. FIG. 7D is a graph that plots Re[Ez] of the structure of FIG. 7A. As shown in FIG. 7A, the device is configured with as an XY grid with a plurality of pixels. Each pixel is configured with either an active material, e.g., GaAs or a vacuum.

Further disclosure is contained in U.S. provisional application 62/300,516, filed Feb. 26, 2016, which is incorporated herein in its entirety. All references that are cited in U.S. provisional application 62/300,516 and the appendix are also incorporated herein in their entirety. Further disclosure is also provided in Lin et al. "*Topology optimization of multi-track ring resonators and 2D microcavities for nonlinear frequency conversion*", Physics—Optics, January 2017 which is also incorporated herein in its entirety. It should be understood that many variations are possible based on the disclosure herein. Although features and elements are described above in particular combinations, each feature or element can be used alone without the other features and elements or in various combinations with or without other features and elements. The digital processing techniques disclosed herein may be partially implemented in a computer program, software, or firmware incorporated in a computer-readable (non-transitory) storage medium for execution by a general-purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general-purpose processor, a special purpose processor, a conventional processor, a digital signal processor (DSP), a plurality of microprocessors, one or more microprocessors in association with a DSP core, a controller, a microcontroller, Application-Specific Integrated Circuits (ASICs), Field-Programmable Gate Arrays (FPGAs) circuits, any other type of integrated circuit (IC), and/or a state machine.

What is claimed is:

1. A fully confined dual frequency optical resonator configured for optical coupling to light having a first frequency cal, the dual frequency optical resonator comprising:
 a plurality of alternating layer pairs configured in a grating configuration, each layer pair having a first layer formed of a first material and a second layer formed of a second material, the first material and second materials being different material,
 each layer having a thickness different than a thickness of an adjacent layer to provide thereby aperiodic layer pairs, the thicknesses of adjacent layers being selected to create, via wave interference with each layer, optical resonances at the first frequency $\omega 1$ and a second frequency $\omega 2$ which is a harmonic of $\omega 1$, and to ensure a maximum spatial overlap between confined modes over the materials, and to enhance nonlinear coupling between the first frequency $\omega 1$ and a second frequency $\omega 2$ such that an overall quality factor Q of at least 1000 is achieved.

2. The dual frequency optical resonator of claim 1 wherein $\omega 2$ is a second harmonic of $\omega 1$.

3. The dual frequency optical resonator of claim 1 wherein $\omega 2$ is a third harmonic of $\omega 1$.

4. The dual frequency optical resonator of claim 1 wherein the thicknesses of the first and second layer are selected to ensure spatial overlap between confined modes to provide thereby a maximum amount of nonlinear coupling between the first frequency $\omega 1$ and a second frequency $\omega 2$.

5. The dual frequency optical resonator of claim 1 wherein the first material is AlGaAs and the second material is Al2O3.

6. The dual frequency optical resonator of claim 1 wherein the first material is GaAs and the second material is SiO2.

7. The dual frequency optical resonator of claim 1 wherein the first material is lithium-niobate (LN) and the second material is air.

8. The dual frequency optical resonator of claim 1 wherein the first and second layer are formed in an etching process.

9. The dual frequency optical resonator of claim 1, wherein maximum spatial overlap between confined modes over the materials is determined with respect to nonlinear coupling (ß) in accordance with the following equation:

$$\bar{\beta} = \frac{\int dr \bar{\epsilon}(r) E_2^* E_1^2}{(\int dr\epsilon_1|E_1|^2)\left(\sqrt{\int dr\epsilon_2|E_2|^2}\right)} \sqrt{\lambda_1^3}.$$

* * * * *

UNITED STATES PATENT AND TRADEMARK OFFICE
CERTIFICATE OF CORRECTION

PATENT NO. : 10,353,269 B2
APPLICATION NO. : 15/443911
DATED : July 16, 2019
INVENTOR(S) : Alejandro Rodriguez et al.

Page 1 of 1

It is certified that error appears in the above-identified patent and that said Letters Patent is hereby corrected as shown below:

In the Claims

In Claim 1, Column 16, Line 11, the portion of the text reading -cal- should read --ω1--.

Signed and Sealed this
Third Day of September, 2019

Andrei Iancu
*Director of the United States Patent and Trademark Office*